Aug. 11, 1953  C. M. HATHAWAY ET AL  2,648,328
ELECTRIC BLOOD PRESSURE RECORDING SYSTEM
Filed Jan. 28, 1950  2 Sheets-Sheet 1
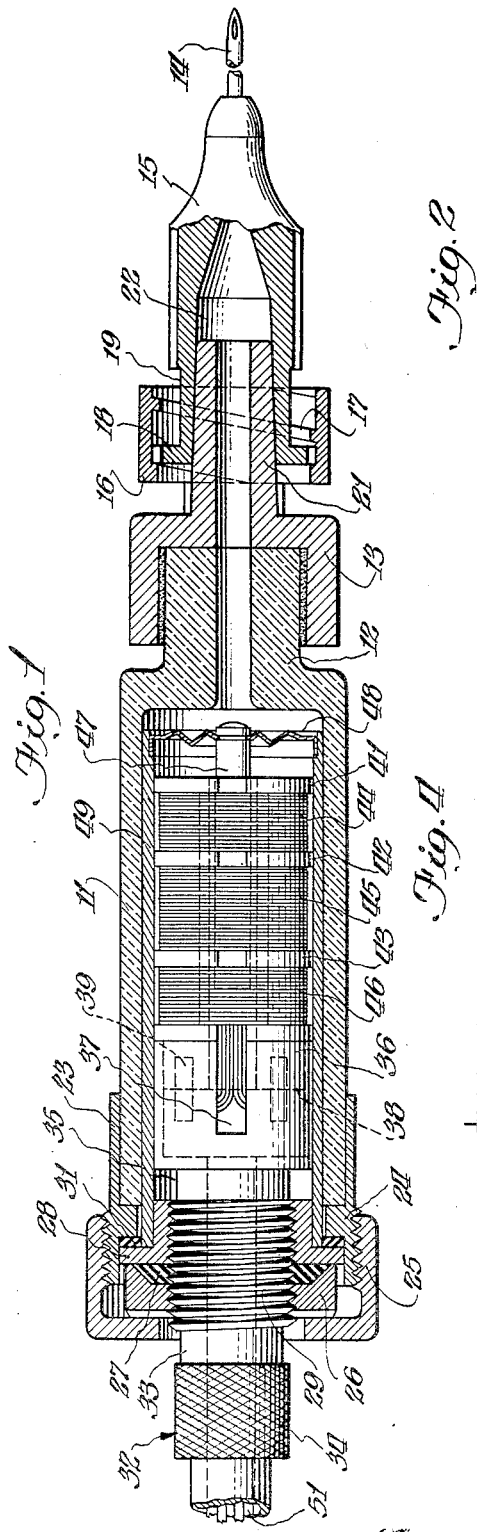
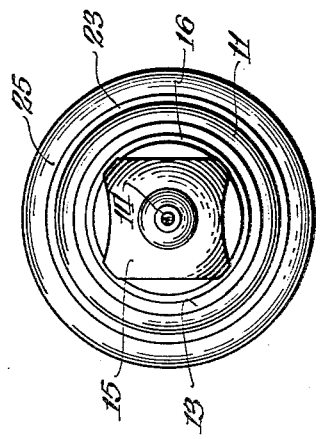
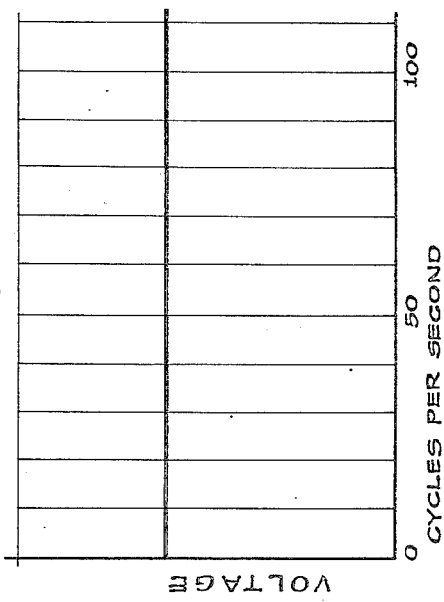
Inventors:
Claude M. Hathaway
Paul W. Schafer
Warren de Blois Tilton, Jr.
By: Alois W. Graf  Attorney.

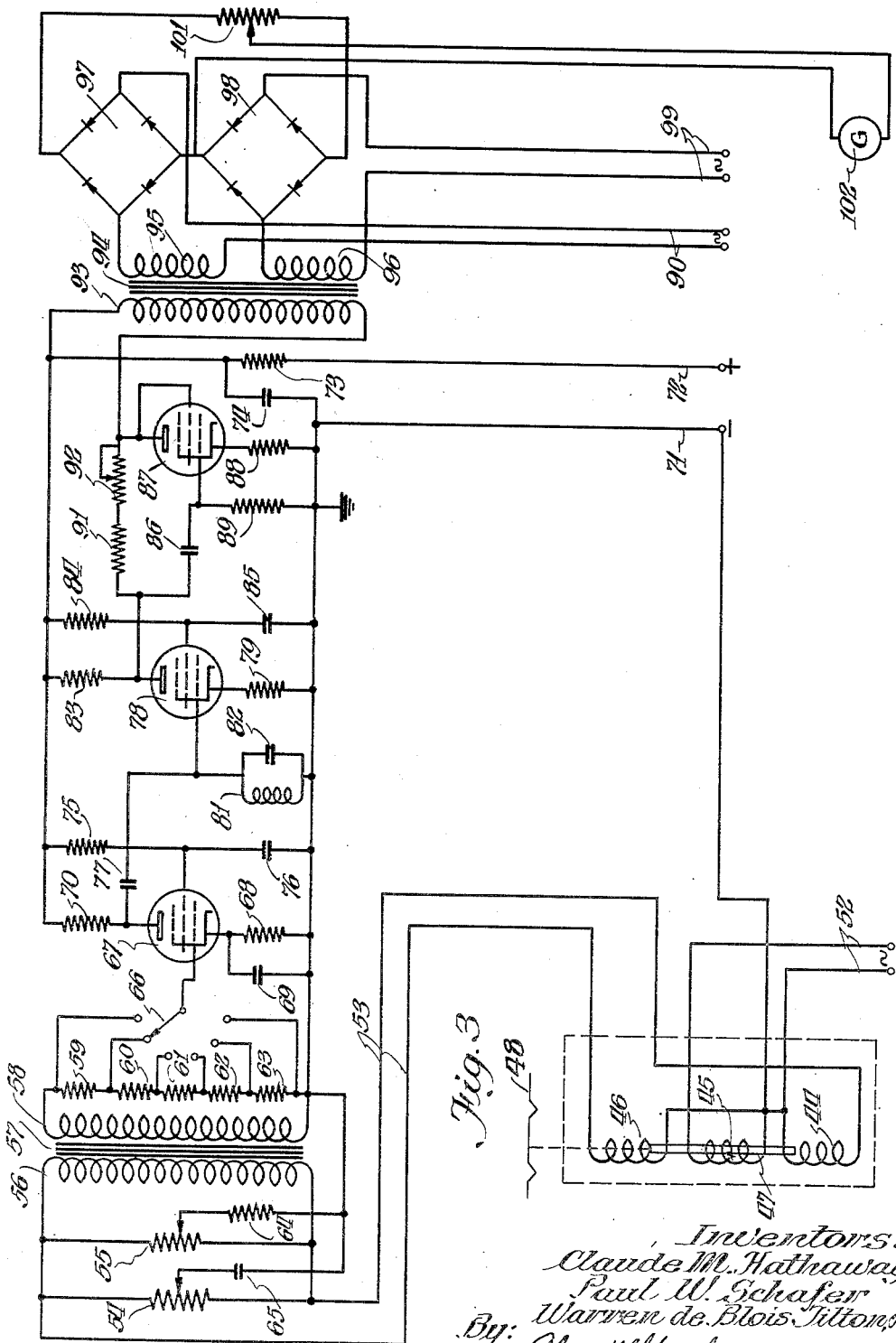

Patented Aug. 11, 1953

2,648,328

UNITED STATES PATENT OFFICE 2,648,328

ELECTRIC BLOOD PRESSURE RECORDING SYSTEM

Claude M. Hathaway, Littleton, and Warren de Blois Tilton, Jr., Denver, Colo., and Paul W. Schafer, Kansas City, Kans., assignors, by direct and mesne assignments, to Hathaway Instrument Company, Denver, Colo., a corporation of Colorado Application January 28, 1950, Serial No. 141,132

10 Claims. (Cl. 128—2.05)

1

The present invention relates to an electric blood pressure recording system, and more particularly to such system employing an electric blood pressure head for obtaining an intravenous pressure indication.

The advent of the electric cardiograph was recognized as being a great step forward in cardiac research to determine the operation of the heart and any variations in such operation which might indicate any abnormal conditions. Research has shown that accurate recording of blood pressure wave shape requires an extended frequency response so as to provide an accurate indication of transient pulses or phenomena in addition to the primary pressure pulses commonly associated with each heart beat. Research has further indicated that an analysis of secondary or subsequent pulsations accompanying each beat of the heart requires a frequency response on the part of the indicating instrument which covers at least a range from 0 to 100 cycles per second.

Further tests and research also indicate that although measuring equipment may be capable of such frequency response, a relatively short length of tubing of approximately 6" between the blood stream and a sensing element will reduce the response to less than 5 cycles per second. It, therefore, is apparent that a minimum of fluid-filled conduit between the needle and the sensing head must be used if accurate blood pressure wave shapes are to be recorded.

In accordance with the present invention, it is proposed to obviate certain disadvantages of the prior art arrangements by replacing the plunger of the hypodermic syringe with an electric pressure sensing device. A tiny diaphragm is mounted in the end of the new plunger and an electric gage element is contained within this plunger to respond to pressure variations applied to the diaphragm. With such an arrangement, it is possible to obtain an output which is constant from a steady pressure to harmonic pressure up to a frequency in excess of 100 cycles per second. It furthermore is possible to obtain a flat response characteristic between 0 and 100 cycles per second.

It, therefore, is an object of the present invention to provide a new and improved method of obtaining an extended frequency response for intravenous cardiac indication.

A further object is to provide an improved electric blood pressure head for use as a plunger in a syringe.

A further object of the invention is to provide an electric blood pressure sensing head for use with a hypodermic syringe wherein the sensing head may be sterilized without damage thereto.

A still further object of the invention is to provide a pressure head having a constant output from a steady pressure to a harmonic pressure up to a frequency of the order of 100 cycles per second.

A still further object of the present invention is to provide a blood pressure indicating system employing a carrier current which is modulated in accordance with pressure variations.

Other and further objects of the present invention subsequently will become apparent by reference to description in connection with the accompanying drawings wherein:

Figure 1 is a cross sectional view of a hypodermic syringe equipped with a plunger type electric blood pressure head;

Figure 2 is an end view of the device shown in Figure 1;

Figure 3 is an electric circuit diagram of an amplifier and demodulation circuit for energizing an oscilloscope or an oscillograph; and Figure 4 is a graphical representation of the response characteristic of the electric blood pressure head shown in Figure 1.

Referring to Figures 1 and 2 of the drawing, it will be noted that there has been illustrated a hypodermic syringe having a cylinder 11 which customarily is formed of glass having a reduced end portion 12 to which is fitted and cemented a metal socket 13. The metal socket 13 is arranged to receive a hypodermic needle 14 which in customary construction is carried by a socket member 15. The outer portion 16 of the socket member 13 is provided with internal threads 17 which may be engaged by the latterly extending projections 18 adjacent to the cylindrical portion 19 of the needle socket 15.

The socket member 13 carries within the outer portion 16 a conical male member 21 having therein a passage which is in communication with the inside of the cylinder 11. The needle socket 15 is provided with a female conical surface 22 which is engaged by the male conical member 21. Such construction forms no particular part of the present invention but merely illustrates a normal conventional hypodermic syringe and needle construction.

The cylinder 11 is normally provided adjacent to its other end with a metal collar or sleeve 23 having a threaded portion 24. A normal hypodermic syringe is provided with a plunger which is guided by a cooperating structure which engages the threaded portion 24 and usually provides laterally extending portions arranged to be engaged by the first and second fingers of the hand. In the present instance, the threaded portion 24 is engaged by a cap structure 25 which bears against a nut lock 26 having an inner chamfered edge which engages a resilient gasket 27. The gasket 27 bears against a flange member 28 having a threaded aperture which engages a threaded stem 29 of the pressure sensing unit. The flange 28 engages a packing ring 31 which bears against the inner stepped configuration of the syringe collar or end member 23.

The threaded portion 29 is a part of a generally cylindrical member of various diameters which serves to hold the sensing coil structure. Immediately adjacent to the threaded portion, the holder 32 has a smooth cylindrical portion 33 adjacent to which is an enlarged knurled portion 34. On the other side of the threaded portion 29 of the member 32 is another cylindrical portion 35 which is joined by an enlarged cylindrical portion 36 having therein in one wall a slot 37. Within the cylindrical portion 36 there is provided, as shown in dotted lines, a socket 38 for receiving the four pins 39 which are a part of a coil unit. The coil unit is in the form of a spool 41 having intermediate flange portions 42 and 43 so as to provide spaces for a plurality of coil windings 44, 45, and 46. The spool 41 has a central aperture for receiving a freely movable magnetic core or rod 47 which is secured to a pressure sensitive diaphragm 48. The magnetic core 47 extends through the entire coil 45 and the ends thereof normally project partially into the coils 44 and 46 at equal distances. The diaphragm 48 is supported at the end of a cylinder 49 formed of magnetic shielding material. The diaphragm 48 normally is as close to the bottom of the glass cylinder 11 so that a minimum of fluid is contained between this diaphragm and the hypodermic needle 14. The cylinder 49 surrounds the spool 41 and the coil holder 36. The cylinder 49 also engages the outer surface of the reduced diameter portion of the flange collar 28. The various conductors leading to the coils 44, 45, and 46 extend through the slot 37 to the various pins 39 so that carrier current may be supplied to coil 45 through the conductors 51, and so that carrier current may be conducted from coils 44 and 46.

In the commercial embodiment, blood pressure heads are provided for two ranges of pressure, one being from 5 mm. to 100 mm. of mercury, and the other being from 25 mm. to 400 mm. of mercury. The syringe has an inner diameter of .3520". The coil spool is ½ inch in length and the cylinder 49 which surrounds the spool and the remaining internal structure of the pressure sensitive head is .3495" in diameter.

The coil 45 as may be seen from Figure 3 is connected to a source of alternating current applied to the conductor terminals 51. This source of alternating current is of carrier frequency which may be approximately 5,000 cycles per second. The coils 44 and 46 are connected in series and the conductors 53 therefrom are connected across a pair of voltage dividers 54 and 55. The voltage dividers are connected across the primary winding 56 of a transformer 57. The secondary winding 58 of the transformer 57 is connected to a series of resistors 59, 60, 61, 62, and 63. One terminal of the secondary winding 58 is connected through a resistor 64 to the adjustable contact of the voltage divider 55. The same terminal of the transformer winding 58 is also connected through a capacitor 65 to the adjustable contact of the voltage divider 54. This arrangement employing the resistor 64 and the condenser 65 connected to the adjustable contacts on the voltage dividers 55 and 54 serves to provide a means of electrically balancing the pressure head.

The junctures or terminals of the resistors 59 to 63 are connected to the contacts of a selector switch 66, the arm of which is connected to the grid of an amplifying tube 67. The cathode of the tube 67 is biased by a resistor 68 which is by-passed by a capacitor 69. A suitable source of anode potential is connected between the conductors 71 and 72. The conductor 72 is connected to a resistor 73 which is connected to a by-pass capacitor 74 having one terminal connected to conductor 71. The upper terminal of the resistor 73 is connected to the anode resistor 70 of the vacuum tube 67. The resistor 73 is connected to a resistor 75 so as to supply proper potential to the screen grid of vacuum tube 67. The screen grid is by-passed to ground by a capacitor 76. The output of the vacuum tube 67 is coupled by a capacitor 77 to the grid of the next vacuum tube 78. The cathode of the vacuum tube 78 is biased by a resistor 79. The grid to cathode circuit of the second amplifying tube 78 includes an impedance circuit comprising an inductor 81 and a capacitor 82 offering a high impedance to the carrier frequency. The anode of the vacuum tube 78 receives its potential through a resistor 83. The screen grid of the vacuum tube 78 receives its potential through a resistor 84 and this grid is by-passed to ground by a capacitor 85.

The output of vacuum tube 78 is coupled by a capacitor 86 to the control grid of the tube 87. The tube 87 is biased by a resistor 88 and a cathode to grid circuit includes a coupling resistor 89. The anode and the screen grid are both connected to the primary winding of the transformer 94. A circuit including a fixed resistor 91 and an adjustable resistor 92 is connected between the anode of the vacuum tube 87 and the anode of the preceding vacuum tube 78 to provide a feedback circuit. The output of the vacuum tube 87 is connected to the primary winding 93 of the transformer 94 having two secondary windings 95 and 96.

The secondary windings 95 and 96 are each connected to a bridge rectifier. These bridge rectifiers are preferably formed of a plurality of oxide elements having non-linear or substantially unidirectional conductive characteristics. One secondary winding 95 has one terminal connected to the bridge rectifier 97, and its remaining terminal is connected to one of the conductors 90 which is connected to a source of alternating or carrier current. The opposite diagonal terminal of the bridge rectifier 97 is connected to one of the conductors 90 so that the bridge rectifier is continuously energized thereby to increase the sensitivity of the bridge rectifier and to balance out minor differences in the starting characteristics of conductivity of the individual oxide rectifier elements of the bridge network.

The other secondary winding 96 of the transformer 94 is connected to a bridge rectifier 98. One terminal of the rectifier 98 and the transformer winding 96 are connected to a pair of conductors 99 which are connected to a source of alternating or carrier current. Opposite diagonals of the bridge networks 97 and 98 are connected in series with each other and with a voltage divider resistor 101. The adjustable contact of the resistor 101 is connected to a galvanometer 102 or other indicating device having its other terminal connected to the juncture between the diagonals of the bridge networks 97 and 98.

While the various values of the resistors and capacitors employed with the vacuum tube 67, 78, and 87 depend upon the types of tubes used, typical values for certain other circuit elements may be of assistance for a better understanding of the circuit arrangement by those skilled in the art. Thus each of the voltage dividers 54 and 55 have a value of 10,000 ohms. The resistor 64 has a value of 27,000 ohms. The resistors 59 to 63 have values of 160,000, 32,000, 4,000, 2,000, and 2,000 ohms respectively. The capacitor 65 has a value of .0002 mfd. The selector switch 66 provides a five step range of pressure indication having values determined by the range of the particular pressure head utilized.

The apparatus heretofore described may be used to measure and record dynamic blood pressure of animals for research studies and human beings for both research and diagnostic analysis. In preparing to use the hypodermic sensing element the narrow sleeve 23 is loosened so that the cylinder 49 may be withdrawn. The end of the hypodermic needle 14 is inserted into a sterile saline solution whereupon the cylinder 49 and the components carried thereby is withdrawn. This draws up a certain amount of saline solution into the glass cylinder 11. Thereupon, as is customary, the hypodermic needle is held in a vertical position and the cylinder is moved upwardly to expel all air so that the entire space between the end of the diaphragm 48 and the opening in the hypodermic needle 14 is completely filled with sterile saline solution. Thereupon the cap 25 is screwed into position.

The needle 14 then is inserted into the body where dynamic blood pressure data is desired. The galvanometer 102 of Figure 3 records the current output of the bridge rectifiers 97 and 98, which is proportional to the static and dynamic pressure applied to the diaphragm 48.

After the hypodermic cylinder and needle have been filled with the saline solution and the cap 25 screwed into position, an electrical balance is obtained in the circuit shown in Figure 3. By the use of an alternating current meter connected to the anode of the vacuum tube 87 it is possible to obtain an indication as to whether or not a null reading is obtained. By means of the controls 54 and 55 this null condition can be obtained. After hydraulic pressure is applied to the diaphragm 48, the magnetic core 47 will be displaced from its former position where a null reading was obtained. The displacement of the core 47 changes the magnitude of the carrier current induced in the coils 44 and 46. Any movement of the core 47 responsive to the dynamic changes in blood pressure brings about opposite changes in the effective impedance of the coils 44 and 46, and hence produce the effect of modulating the carrier current obtained from these coils. This modulated carrier current, therefore, is applied to the primary winding 56 of the transformer 57 so that these changes may be amplified by a desired factor as determined by the position of the switch 66. The vacuum tubes 67, 78, and 87 supply the amplified current to the output transformer 94, which feeds the bridge rectifiers 97 and 98, thereby to produce an indication on the galvanometer 102 which is proportional to the static and dynamic pressure being applied to the diaphragm 48.

While for the purpose of illustrating and describing the present invention a preferred embodiment has been shown in the drawings, it is to be understood that such variations in the components employed and circuit elements utilized are contemplated as may be commensurate with the spirit and scope of the invention defined in the accompanying claims.

We claim:

1. An intravenous blood pressure device comprising a small hypodermic syringe having a needle socket, a pressure sensitive device fitted within the cylinder of said syringe and having a pressure sensitive diaphragm, an electromagnetic coil having means for varying the inductance thereof in accordance with movements of said diaphragm, said diaphragm being positioned close to said needle socket to hold to a minimum the volume between said diaphragm and said needle socket.

2. An intravenous blood pressure device comprising a small hypodermic syringe having a needle socket, a pressure sensitive device fitted within the cylinder of said syringe and having a pressure sensitive diaphragm, an electromagnetic coil having means for varying the inductance thereof in accordance with movements of said diaphragm, said diaphragm being positioned close to said needle socket to hold to a minimum the volume between said diaphragm and said needle socket, and means for exciting said electromagnetic coil with a carrier current.

3. An intravenous blood pressure device comprising a small hypodermic syringe having a needle socket, a pressure sensitive device fitted within the cylinder of said syringe and having a pressure sensitive diaphragm, an electromagnetic coil having means for varying the inductance thereof in accordance with movements of said diaphragm, said diaphragm being positioned close to said needle socket to hold to a minimum the volume between said diaphragm and said needle socket, and means for clamping said diaphragm and electromagnetic coil in fixed position.

4. A device for indicating the intravenous blood pressure comprising a hypodermic syringe having a cylinder fitted with a pressure sensitive device therein, said device comprising a pressure responsive diaphragm, a magnetic core member connected to said diaphragm, a plurality of electromagnetic coils mounted on a spool surrounding said core member and having an axial bore sufficient to permit movement of said core member relative thereto to vary the inductive coupling therebetween, means including a source of carrier current connected to produce a current flow through said coils, means connected to the coils responsive to currents induced therein for detecting the magnitude and direction of the movement of said core member, and means responsive to said detecting means to produce an indication.

5. A system for producing a cardiac indication which comprises a hypodermic syringe having as its plunger an electric pressure sensitive inductance device substantially filling the cylinder of said syringe, the inner end of said device having peripheral contact with the wall of said syringe and having means for varying the inductance in accordance with pressure, the remainder of said cylinder and the needle of said syringe being adapted to be filled with a relatively small volume of sterile saline solution to couple as directly as possible said pressure sensitive inductance device to the blood stream of an individual, and electric means connected to said pressure sensitive inductance device to indicate pressure variations occurring in said saline solution.

6. A system for producing a cardiac indication which comprises a hypodermic syringe having as its plunger a pressure sensitive diaphragm connected to an electric pressure sensitive inductance device, said diaphragm and said device substantially filling the cylinder of said syringe, the remainder of said cylinder and the needle of said syringe being adapted to be filled with a relatively small volume of sterile saline solution to couple as directly as possible said pressure sensitive diaphragm to the blood stream of an individual, and electric means connected to said pressure sensitive inductance device to indicate pressure variations occurring in said blood stream.

7. An intravenous blood pressure device comprising a small hypodermic syringe having a needle socket, a pressure sensitive device fitted within the cylinder of said syringe, said device having a pressure sensitive diaphragm located closely adjacent said needle socket to hold to a minimum the volume between said diaphragm and said socket, and an inductor having movable magnetic core means connected to said diaphragm to vary the effective impedance of said inductor in accordance with the pressure responsive movements of said diaphragm.

8. An intravenous blood pressure device comprising a small hypodermic syringe having a needle socket, a pressure sensitive device fitted within the cylinder of said syringe and having a pressure sensitive diaphragm positioned close to the needle socket to hold to a minimum the volume between said diaphragm and said needle socket, said device having a plurality of electromagnetic coils arranged in axial alignment on a spool having an axial passage therethrough, means including a source of carrier current for inducing current in said coils, said coils being connected to an electric indicating device, and a magnetic member connected to said diaphragm and arranged to move in said spool passage relative to said coils to vary the coupling therebetween in accordance with the pressure responsive movements of said diaphragm.

9. An intravenous blood pressure device comprising a small hypodermic syringe having a needle socket, a pressure sensitive device fitted within and substantially filling the cylinder of said syringe and having a pressure sensitive diaphragm positioned close to the needle socket to hold to a minimum the volume between said diaphragm and said needle socket, said device having a plurality of electromagnetic coils arranged in axial alignment on a spool having an axial passage therethrough, means including a source of current for producing a current flow through said coils, said coils being connected to an electric indicating device, and a magnetic member connected to said diaphragm and arranged to move within said spool passage relative to said coils to change the inductive coupling therebetween in accordance with the pressure responsive movements of said diaphragm, and means for clamping said diaphragm and said coils in fixed position.

10. An intravenous blood pressure device comprising a small hypodermic syringe having as its plunger an electric pressure sensitive inductance device substantially filling the syringe cylinder, the inner end of said device having peripheral contact with the wall of said syringe and having means for varying the inductance in accordance with pressure, the inner end of said pressure sensitive device being positioned close to the open end of said cylinder to hold to a minimum the volume between said end and said pressure sensitive inductance device, the remainder of said syringe being adapted to be filled with a sterile saline solution to couple said pressure sensitive device as directly as possible to the blood stream of an individual.

CLAUDE M. HATHAWAY.
WARREN DE BLOIS TILTON, JR.
PAUL W. SCHAFER.

References Cited in the file of this patent

UNITED STATES PATENTS

| Number | Name | Date |
|---|---|---|
| 842,339 | Russo | Jan. 29, 1907 |
| 1,403,384 | Baruch | Jan. 10, 1922 |
| 1,686,504 | Dodge et al. | Oct. 2, 1928 |
| 1,976,707 | Weinstein | Oct. 9, 1934 |
| 2,001,537 | Mason | May 14, 1935 |
| 2,600,324 | Rappaport | June 10, 1952 |

FOREIGN PATENTS

| Number | Country | Date |
|---|---|---|
| 548,736 | Great Britain | Oct. 22, 1942 |
| 627,341 | France | Oct. 1, 1927 |